UNITED STATES PATENT OFFICE.

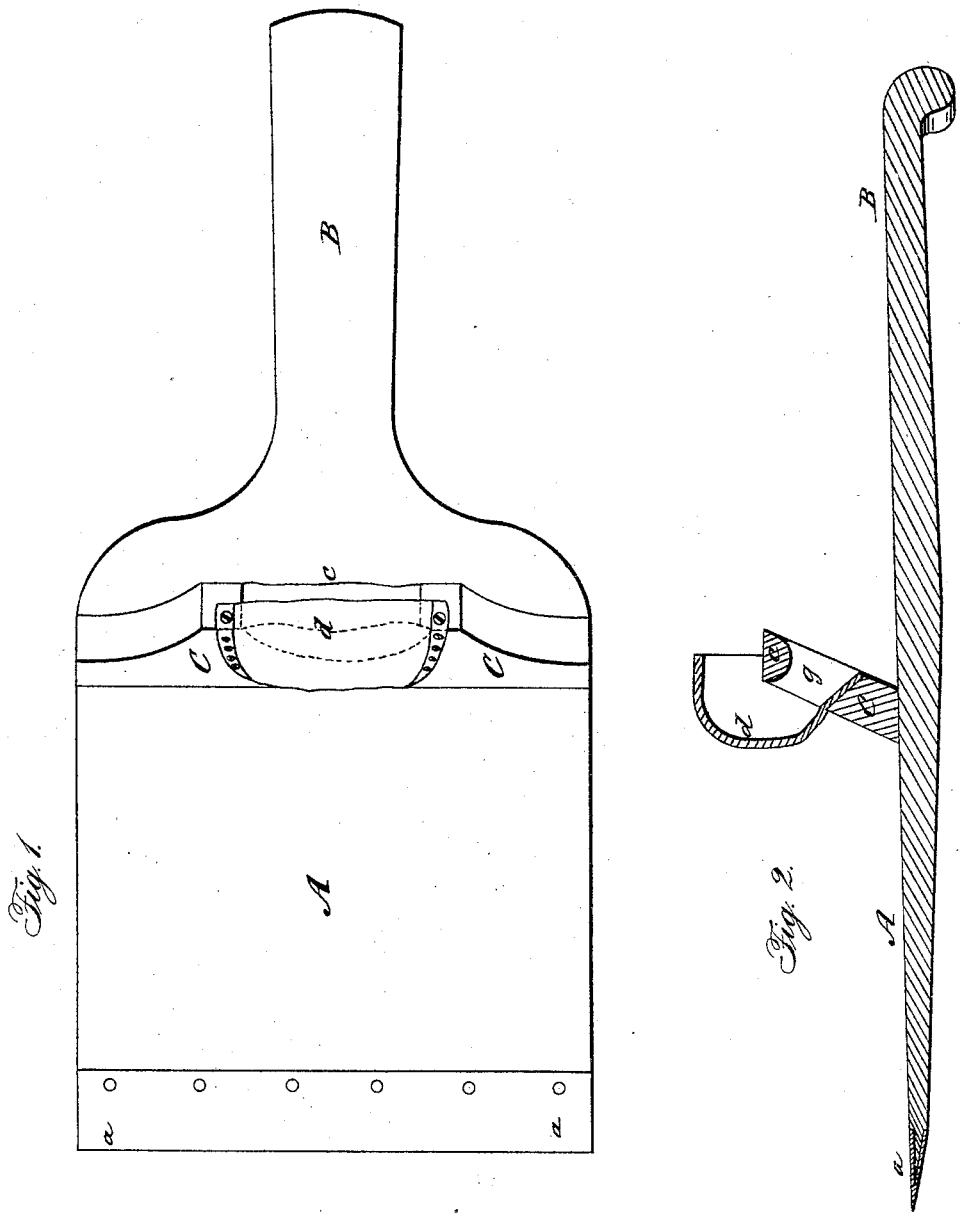

DAVID N. THAYER, OF MAYVILLE, NEW YORK.

IMPROVEMENT IN SNOW-SHOVELS.

Specification forming part of Letters Patent No. 50,050, dated September 19, 1865.

*To all whom it may concern:*

Be it known that I, DAVID N. THAYER, of Mayville, in the county of Chautauqua and State of New York, have invented a new and Improved Snow-Shovel; and I do hereby declare that the following is a full, clear, and exact description thereof, reference being had to the accompanying drawings, making a part of this specification, in which—

Figure 1 is a top view of the improved shovel. Fig. 2 is a longitudinal central section through the same.

The object of this invention is to construct hand snow-shovels with guards, which are so applied that the snow is prevented from slipping backward during the act of gathering or discharging the load; also, to so construct hand-shovels that the load which is gathered upon them can be sustained by the hands to a much better advantage than where the handle of the shovel is grasped with both hands and the load is all on one end.

To enable others skilled in the art to understand my invention, I will describe its construction and operation.

In the accompanying drawings, A represents the palm of the shovel, and B is the narrow handle thereof. The palm A will be made of wood, and it is tapered, as shown in Fig. 2, so as to terminate in a sharp edge, which is shod with a steel plate, $a$, for the purpose of increasing the durability of said edge.

The handle B, which is formed on the rear end of the palm A, is made narrow and short, and its rear end terminates in a rounded portion, $b$, which can be grasped and held by the hand by passing the fingers over the end of this portion.

C represents a guard which extends transversely across the rear portion of the palm A from side to side, and which is secured to the upper surface of this palm so as to incline slightly forward. This guard is intended to serve two purposes—viz., it prevents the snow from slipping backward in the act of gathering a load or discharging a load. It also serves as a means for grasping the shovel as near to the load as possible. For this purpose a handle, $c$, is formed, as shown in the drawings, which handle is partially covered by a bonnet or guard, $d$, that is made of leather or other suitable material and tacked around the front part of the guard-board hole, $g$, so that when the handle is grasped by the hand the guard $d$ will protect it from snow.

It will be seen that in using my improved shovel it is grasped by the handle $c$ with one hand and by the end of the handle B with the other hand. This will bring the weight of the load which is gathered upon the palm A upon the hand which grasps the handle $c$ nearest the load. By this means the load can be sustained to a much better advantage, and the shovel can be handled with much less labor than with shovels hitherto constructed.

I prefer to protect the hand which grasps the handle $c$, as above described, but this is not essential, as the guard may be dispensed with and the hand protected from contact with the ice and snow which banks up against the guard C by a glove or in any other suitable manner.

I prefer to construct my improved shovels of wood; but they may be made of metal, if desirable.

Having thus described my invention, what I claim as new, and desire to secure by Letters Patent, is—

1. A snow-shovel which is provided with a guard, C, extending transversely across its palm, and also a handle, $c$, or its equivalent, substantially as described.

2. In a shovel in which the handle and blade are on a straight line and in the same piece, the hand-protector $d$, applied to the guard C, substantially as and for the purposes described.

Witness my hand this 21st day of July, 1865, in the matter of my application for a patent on a snow-shovel.

DAVID N. THAYER.

Witnesses:
  EDM. F. BROWN,
  E. SCHAFER.